US006616023B1

(12) United States Patent
Dahl et al.

(10) Patent No.: US 6,616,023 B1
(45) Date of Patent: Sep. 9, 2003

(54) ANTI-SWAY STABILIZING SUPPORT FOR AN EQUIPMENT CARRIER

(75) Inventors: Mark A. Dahl, Rice Lake, WI (US); Todd W. Lassanske, Ridgeway, WI (US)

(73) Assignee: Graber Products, Inc., Madison, WI (US)

( * ) Notice: Subject to any disclaimer, the term of this patent is extended or adjusted under 35 U.S.C. 154(b) by 0 days.

(21) Appl. No.: 09/839,198

(22) Filed: Apr. 19, 2001

(51) Int. Cl.$^7$ ............................... B60R 9/06; B60R 9/10
(52) U.S. Cl. .................... 224/537; 224/324; 224/924
(58) Field of Search ................... 224/924, 537, 224/324

(56) References Cited

U.S. PATENT DOCUMENTS

| | | |
|---|---|---|
| 5,056,700 A | 10/1991 | Blackburn et al. |
| 5,259,542 A | 11/1993 | Newbold et al. |
| 5,495,970 A * | 3/1996 | Pedrini .................. 211/17 |
| 5,505,357 A | 4/1996 | Chimenti et al. |
| 5,573,165 A * | 11/1996 | Bloemer et al. ............ 224/523 |
| 5,938,093 A * | 8/1999 | Bloemer et al. ............ 224/504 |
| 6,286,738 B1 * | 9/2001 | Robins et al. .............. 224/314 |

* cited by examiner

Primary Examiner—Stephen P. Garbe
(74) Attorney, Agent, or Firm—Boyle, Fredrickson, Newholm, Stein & Gratz, S.C.

(57) ABSTRACT

A stabilizing support for engaging an article such as a bicycle with a vehicle-mounted carrier which includes a rearwardly extending support member. The support generally includes a first support section having a recess within which a portion of the bicycle frame is received. The support further includes a stabilizer section which is pivotably mounted relative to the first support section. The stabilizer section includes a pair of legs which are spaced apart from each other to define an open area therebetween. The stabilizer section can be moved in either direction to various positions so as to receive and engage portions of the bicycle frame or other parts of the bicycle within the open area. The stabilizer section engages the bicycle at a location vertically offset from the location at which the bicycle frame is engaged with the first support section, to stabilize the bicycle.

29 Claims, 3 Drawing Sheets

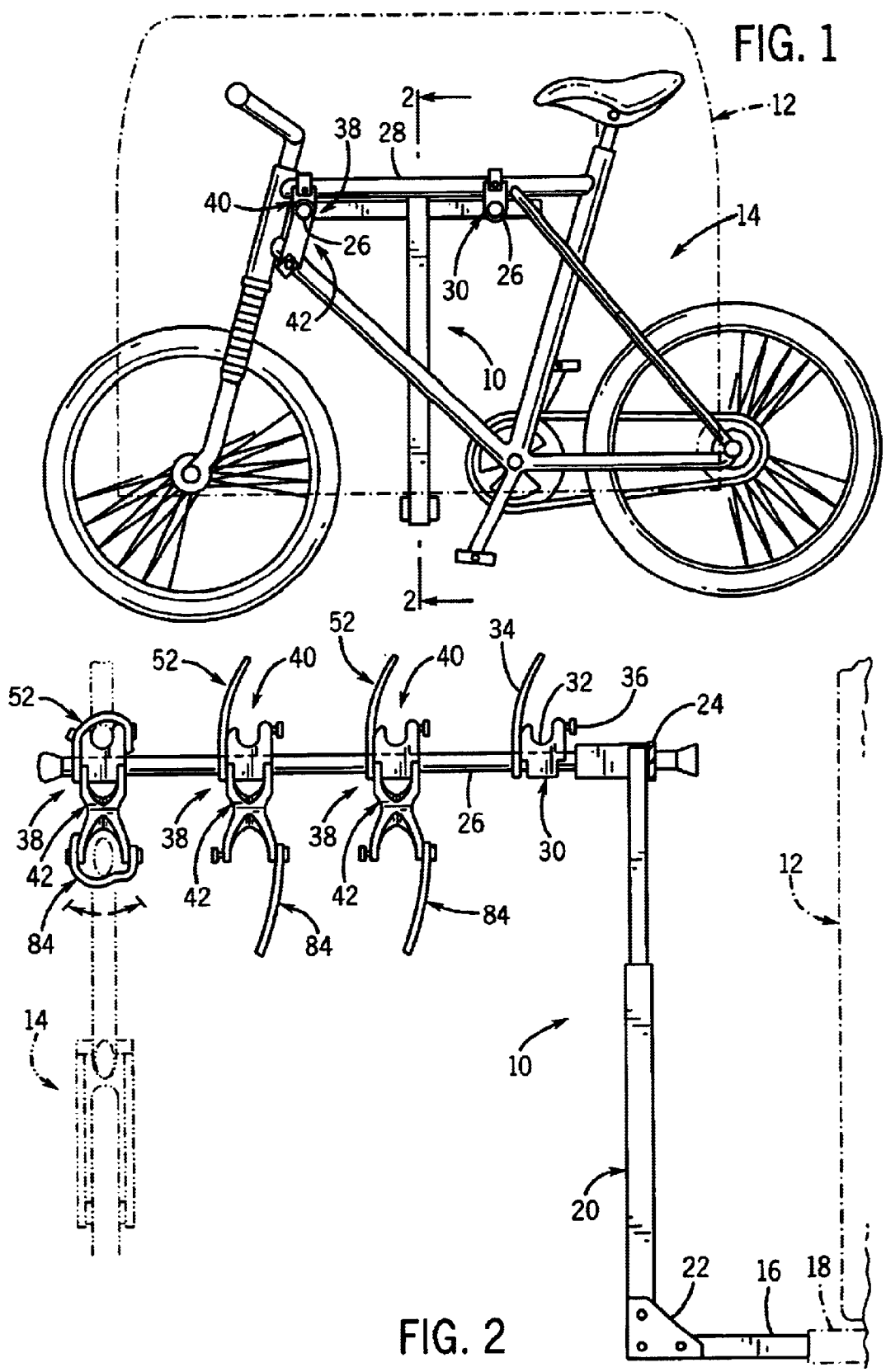

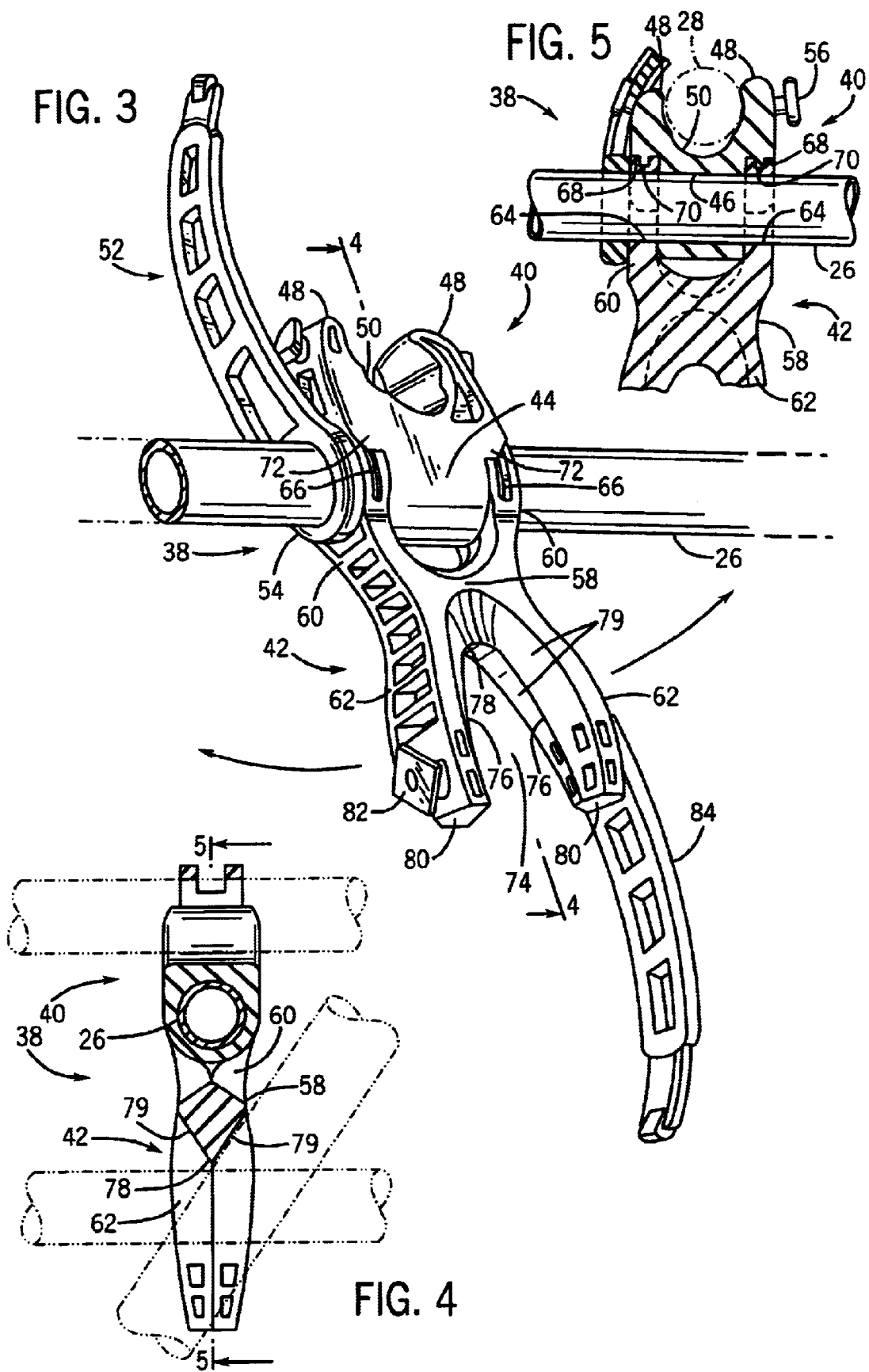

001
ANTI-SWAY STABILIZING SUPPORT FOR AN EQUIPMENT CARRIER

BACKGROUND AND SUMMARY OF THE INVENTION

This invention relates to vehicle-mounted equipment carriers, and more particularly to a stabilizing support for use with a vehicle-mounted equipment carrier.

Vehicle-mounted equipment carriers are commonly employed to support articles, such as bicycles, on a vehicle during transport. Such carriers are often mounted to the trunk of a vehicle or to a rearwardly extending trailer hitch affixed to the vehicle. A common carrier construction utilizes a trunk-mounted or hitch-mounted support structure, from which a pair of support bars or arms extend rearwardly. The support bars are adapted to engage the bicycle at spaced locations, such that the bicycle is suspended from the support bars. Typically, the support bars engage one of the frame members of the bicycle, such as the top tube or a down tube of the bicycle. Engagement members, in the form of support cradles or blocks, are engaged with the support bars and engage the bicycle tube. Resilient retainer straps are utilized to maintain engagement of the bicycle tube with the support blocks.

While the above construction provides satisfactory securement of a bicycle to a vehicle-mounted carrier, it is somewhat disadvantageous in that a majority of the weight of the bicycle is located below the point at which the bicycle is engaged with the support blocks. This can result in swinging of the bicycle about the tube from which the bicycle is suspended, which causes adjacent bicycles to contact each other during transport.

It is an object of the present invention to provide a stabilizing support arrangement for use in connection with a vehicle-mounted equipment carrier, which reduces the tendency of articles, such as bicycles, to swing during transport when secured to the carrier. It is a further object of the invention to provide such a support arrangement which provides a great deal of flexibility in enabling the support arrangement to be engaged with the article at a location which is vertically spaced from the primary points of engagement of the article with the carrier, to stabilize the article during transport. Yet another object of the invention is to provide such a stabilizing support arrangement which provides an open area within which a portion of the article is received, to facilitate engagement of the article with the support arrangement at a location spaced from the primary support locations. A still further object of the invention is to provide such a stabilizing support arrangement which is relatively simple in its components and construction, and which enables engagement with the article in a variety of positions and at a variety of locations.

The invention contemplates a stabilizing support for use in securing an article to a vehicle-mounted carrier having a load-carrying member, such as a support bar extending rearwardly from support structure such as a hitch-mounted rack or a trunk-mounted rack. The stabilizing support includes a first support section which is adapted for engagement with the load-carrying member, and a stabilizer section which is movably mounted relative to the support section. The support section includes support structure which is adapted for engagement with the article in a first location. Representatively, the support section may face upwardly so as to support at least a portion of the weight of the article. The stabilizer section includes structure defining an open area, and a portion of the article is adapted to be received within the open area at a location spaced vertically from the first location where the first support section engages the article. Engagement of the article within the open area of the stabilizer section functions to impart stability to the article so as to limit the article from swinging about the point at which the article is engaged with the first support section. The stabilizer section preferably includes a pair of legs between which the open area is defined.

The first support section and the stabilizer section include aligned passage structure within which the load-carrying member is received. The stabilizer section is pivotable relative to the first support section, and in one form is pivotably mounted to the first support section. In one form, the stabilizer section is pivotable about a pivot axis coincident with a longitudinal axis along which the load-carrying member extends.

The stabilizer section may be in the form of an H-shaped member, defining a connector portion located outwardly of the load-carrying member. A pair of mounting members extend inwardly from the connector section, and each mounting member includes an opening through which the load-carrying member extends for providing pivoting movement of the stabilizer section relative to the load-carrying member. In one form, the first support section includes a central mounting area located between the mounting members of the stabilizer section, defining a passage aligned with the mounting member openings for receiving the load-carrying member. The legs extend outwardly from the connector section, such that an open area is located outwardly of the connector section between the legs. The space between the outer ends of the legs defines an outwardly facing entrance to the open area between the legs, and enables various portions of the article to be received within the open area between the legs. In a preferred form, the legs define facing inner edges which converge together in an inward direction, to provide a narrowing of the open area between the legs in an outward-to-inward direction. In this manner, the legs can be engaged with various portions of the article, and the convergent inner edges of the legs provide engagement of the legs with the article when the stabilizer section is moved to a position in which a portion of the article is received between the legs. A resilient retainer strap is adapted to be placed about the article so as to retain the portion of the article within the open area between the legs. Representatively, the legs are configured such that various portions of the article can be received between the legs. For example, when a bicycle is supported by the load-carrying members by engagement with the top tube of the bicycle, various other portions of the bicycle such as the down tube, seat tube or bicycle tire can be positioned between the legs to stabilize the bicycle. The space between the legs allows the stabilizer section to receive and engage the article regardless of the position of the article relative to the load-carrying member. That is, the stabilizer section can be pivoted in either direction about the load-carrying member to position the article within the space between the legs.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings:

FIG. 1 is a rear elevation view showing a bicycle supported by a vehicle-mounted carrier with which the stabilizing support of the invention is adapted to be used;

FIG. 2 is a partial section view taken along line 2—2 of FIG. 1;

FIG. 3 is an isometric view illustrating one of the stabilizing supports of the invention as mounted to a load-carrying member forming a part of the vehicle-mounted carrier illustrated in FIGS. 1 and 2;

FIG. 4 is a section view taken along line 4—4 of FIG. 3;

FIG. 5 is a partial section view taken along line 5—5 of FIG. 4; and

DETAILED DESCRIPTION OF THE INVENTION

Figure 6A:
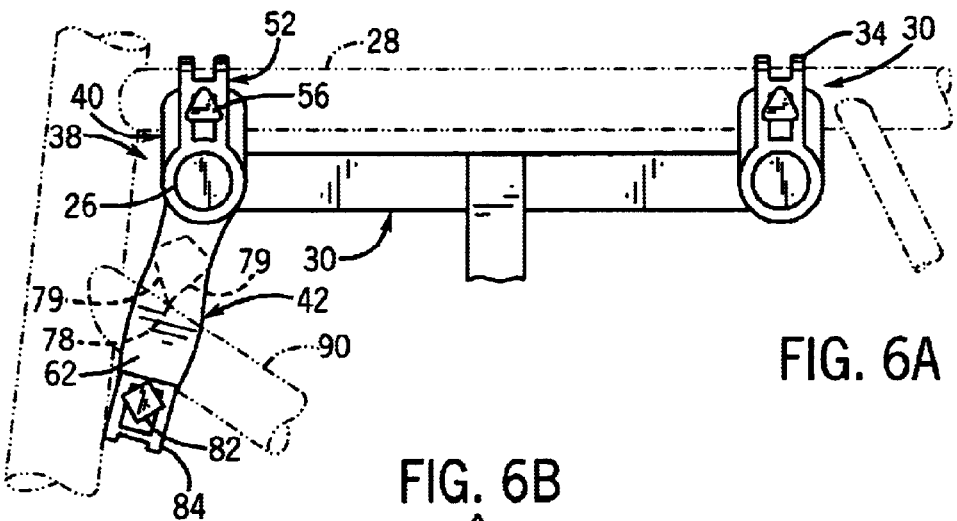
FIGS. 6a–6c show various support member configurations for mounting bicycles of different styles to the vehicle-mounted carrier of FIGS. 1 and 2.

FIGS. 1 and 2 generally illustrate an equipment-carrying rack assembly 10 mounted to the rear of a vehicle 12 for supporting articles of equipment or the like, such as one or more bicycles 14, during transport. Generally, rack assembly 10 includes a hitch engagement member 16 engageable with a rearwardly extending trailer hitch 18 rigidly mounted to the frame of vehicle 12 in a manner as is known. Rack assembly 10 further includes an upright 20 extending upwardly from the outer end of hitch engagement member 16 and interconnected therewith through a bracket arrangement 22. A transverse support member 24 is mounted toward the upper end of upright 20, and a pair of rearwardly extending support bars 26 are interconnected with transverse support member 24 in a manner as is known. These components of rack assembly 10 are known to those of ordinary skill in the art, and may be such as is available from Graber Products, Inc. of Madison, Wis. under its designation T-RAX.

A series of supports is mounted to support bars 26 for supporting bicycle 14. As shown in FIG. 1, a pair of supports is mounted one to each of support bars 26 for engaging a structural member of bicycle 14, such as top tube 28, in a pair of spaced locations. One of the supports is a support block 30 of conventional construction, in the form of a cradle-type member defining an upwardly facing rounded recess 32 within which top tube 28 of bicycle 14 is adapted to be received. Support block 30 includes a passage through which support bar 26 extends, such that support block 30 can be moved to various positions on support bar 26. A resilient strap-type retainer 34 is engaged with support bar 26 and a retainer button 36 on one side of support block 30, and can be stretched across recess 32 and engaged with a retainer button 36 on the opposite side of support block 30 for maintaining top tube 28 of bicycle 14 in recess 32.

A stabilizing support 38 is carried by the support bar 26 opposite a support block 30. In a manner to be explained, stabilizing support 38 engages bicycle 14 at a location, vertically spaced from the locations at which bicycle top tube 28 is engaged with support bars 26, so as to limit swinging or swaying movement of bicycle 14 during transport.

Referring to FIGS. 3–5, each stabilizing support 38 includes a first support section 40 and a stabilizer section 42. Generally, first support section 40 is similar in construction to support block 30, including a central mounting section 44 defining a passage 46 within which support bar 26 is received. First support section 40 further includes a pair of spaced apart upwardly extending engagement members 48 which cooperate to define an upwardly facing open arcuate recess 50. Engagement members 48 are preferably formed of a resilient material, to enable engagement members 48 to flex when top tube 28 is inserted therebetween into recess 50 and to provide a clamp-type engagement with top tube 28. Further, the resilient material of engagement members 48 increases the frictional engagement with top tube 28, so as to prevent bicycle 14 from sliding relative to first support section 40.

A resilient retainer strap 52 includes a ring-like mounting section 54 defining an opening within which support bar 26 is received. Retainer strap 52 is of conventional ladder-type construction, and can be stretched across top tube 28 into engagement with an outwardly extending button-type retainer 56 extending outwardly from the opposite engagement member 48. In this manner, retainer strap 52 is operable to maintain top tube 28 within recess 50.

Stabilizer section, 42 of stabilizing support 38 is in the form of a generally H-shaped member including a connector section 58, a pair of mounting members 60 extending inwardly from connector section 58 and a pair of legs 62 extending outwardly from connector section 58. Mounting members 60 and connector section 58 cooperate to define an inwardly facing U-shape, and legs 62 and connector section 58 cooperate to define an outwardly facing U-shape.

The inner end of each mounting member 60 is formed with an opening 64. As shown in FIG. 5, openings 64 are aligned with each other and are also aligned with passage 46 in central mounting section 44 of first support section 40. In this manner, mounting members 60 and mounting section 44 cooperate to define aligned passage structure through which support bar 26 extends.

The inner ends of mounting members 60 are ring-like in form, and each defines an outwardly facing groove 66. First support section 40 defines a pair of inwardly facing shoulders 68, and a tongue 70 extends inwardly from each shoulder 68. Each tongue 70 is received within one of grooves 66, for guiding pivotal movement between stabilizer section 42 and first support section 40. In addition, first support section 40 includes resilient wall sections 72, which overlie the innermost areas of the ring-like inner ends of mounting members 60. Wall sections 72 are formed on both sides of first support section 40, and overlie greater than half of the circumference of the ring-like inner portion of each mounting member 60. In this manner, wall sections 72 provide positive engagement of stabilizer section 42 with first support section 40 when removed from engagement with support bar 26. Alternatively, wall sections 72 and mounting members 60 may be constructed without any such interlocking feature, such that first support section 40 and stabilizer section 42 are maintained together simply by engagement with support bar 26.

Legs 62 and connector section 48 cooperate to define an outwardly open space or open area 74 between legs 62. Open area 74 is bounded by side edges 76 defined by legs 62, in combination with an arcuate end edge 78 defined by connector section 58. Side edges 76 converge in an outward-to-inward direction toward end edge 78, to provide an increasingly narrow transverse dimension to space 76 in an outward-to-inward direction. Legs 62 and connector section 58 define outwardly divergent beveled edges 79 outwardly of side edges 76 and end edge 78.

Each leg 62 further includes a button-type retainer 82. A resilient ladder-type retainer strap 84 is engaged with one of retainers 82.

With the construction as shown and described, stabilizer section 42 is pivotable relative to support bar 26 and first support member 44 about a pivot axis coincident with the longitudinal axis of support bar 26, due to engagement of support bar 26 through openings 64 and passage 46. First support section 40 can be moved to various angular positions relative to support bar 26, and stabilizer section 42 can be pivotably moved to various angular positions relative to support bar 26 and first support section 40. While the pivotable mounting of stabilizer section 42 has been shown and described with respect to common engagement of both first support section 40 and stabilizer section 42 with support bar 26, it is understood that stabilizer section 42 could be mounted to support bar 26 independently of first support section 40. It is also understood that first support section 40 may be provided with a pivotable mounting arrangement for stabilizer section 42 other than via mounting to support bar 26, such that stabilizer section 42 may be pivotable about a pivot axis offset from the longitudinal axis of support bar 26.

Figure 6B:
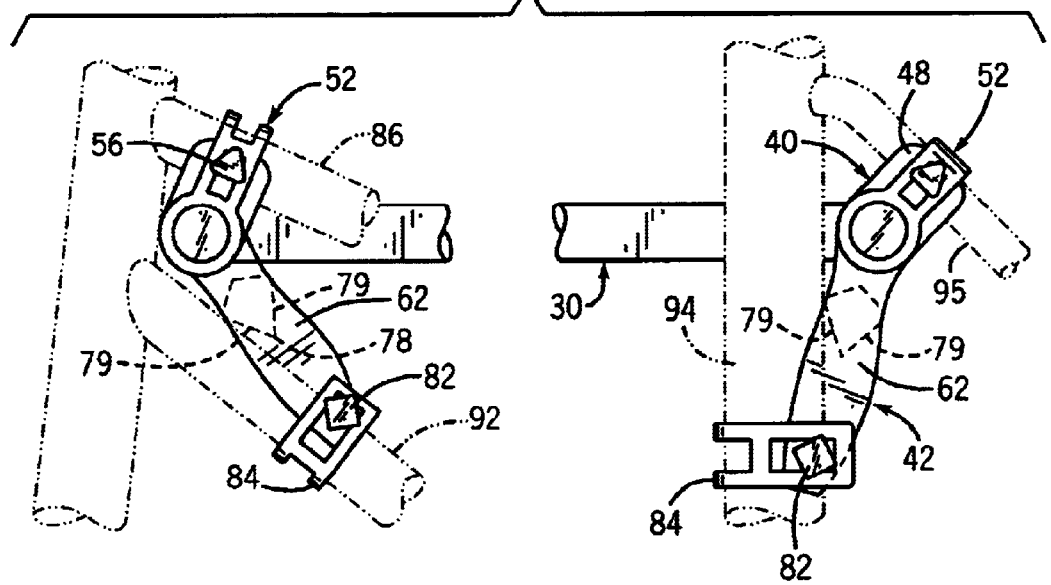
Figure 6C:
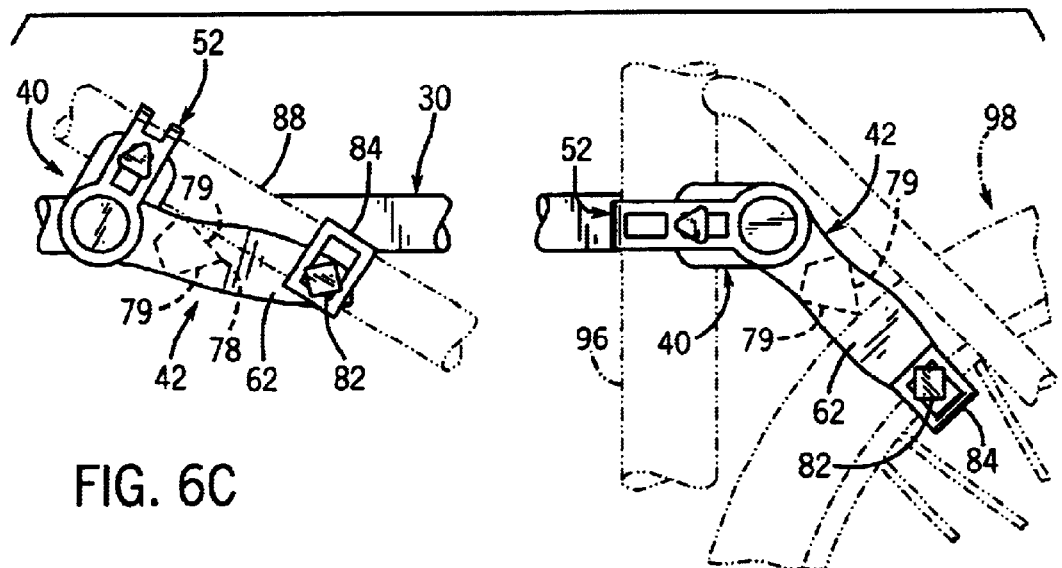

In operation, stabilizing support 38 is utilized to mount bicycle 14 to carrier 10 by positioning first support section 40 such that one of the tubes or other structural members of bicycle 14 is received within recess 50. Examples are illustrated in FIGS. 6a–6c. In FIG. 6a, first support section 40 is positioned so as to face upwardly and to engage bicycle top tube 28. In FIG. 6b, first support section 40 is oriented at an angle and engages an angled down tube 86 of a different style of bicycle 14. FIG. 6c illustrates an arrangement similar to FIG. 6b, showing engagement with an angled down tube 88 of a differentially styled bicycle 14.

Once bicycle 14 is situated and engaged with first support section 40 and support block 30, such as shown in FIG. 6a, stabilizer section 42 is pivoted to a position in which another structural member of bicycle 14, such as down tube 90, is received within open area 74 between legs 62. Retainer strap 84 is then stretched across the outer end of open area 74 and engaged with retainer 82 on the opposite leg 62, so as to maintain down tube 90 within open area 74. The convergent configuration of leg side edges 76 and the closed inner end defined by end edge 78, in combination with beveled edges 79, results in linear contact of side edges 76 and end edge 78 with down tube 90, to provide a secure engagement of down tube 90 within the open area defined by edges 76, 78. This provides engagement of the frame of bicycle 90 at a location spaced vertically from the support of top tube 28 by first support section 40 and support block to stabilize bicycle 14 against swinging during transport.

FIG. 6b illustrates alternative configurations for engaging stabilizer section 42 with other areas of a bicycle frame. As shown in the left-hand portion of FIG. 6b, stabilizer section 42 is pivoted such that a down tube 92 of bicycle 14 is engaged by stabilizer section 42. Down tube 92 is engaged with the outer extent of beveled edge 79, to provide secure contact with down tube 92. The clearance provided by beveled edge 79 enables stabilizer section 42 to be positioned such that down tube 92 extends into open area 74 toward the outer ends of legs 62. Retainer strap 84 is wrapped about the underside of down tube 92 so as to provide secure engagement of down tube 92 with stabilizer section 42 at two locations, i.e. the outer end of beveled edge 79 and at the outer ends of legs 62 via retainer strap 84. In the configuration shown in the right hand portion of FIG. 6b, one side of the rear fork of bicycle 14, shown at 94, is received within recess 50 of first support section 40. Stabilizer section 42 is pivoted into engagement with the seat post of bicycle 14, shown at 94. Again, the beveled edge 79 of connector section 58 and legs 62 facilitates engagement of seat post 94 within open area 74 between legs 62, and seat post 94 engages the outer end of beveled edge 79. Retainer strap 84 is wrapped about seat post 94, to maintain engagement of seat post 94 with stabilizer section 42. As before, this configuration provides two-point contact between seat post 94 and stabilizer section 42, i.e. at the inner end of beveled edge 79 and at the outer ends of legs 62 via retainer strap 84. First support section 40 is pivoted to an angled orientation, and engages a rearwardly extending fork tube 95 extending from seat post 94. Typically, with reference, to FIG. 6b, one or the other of the illustrated stabilizing configurations is employed for engaging the frame of bicycle 14 at a location below the upper support provided by first support section 40, to stabilize bicycle 14 against swinging. It is understood, however, that a stabilizer section 42 may be provided at each support bar 26 if desired.

As shown in the left-hand portion of FIG. 6c, stabilizer section 42 can be pivoted into engagement with the underside of down tube 88 and retainer strap 84 wrapped about the upper portion of down tube 88. Again, the beveled edge 79 of connector section 58 and legs 62 facilitates receipt of down tube 88 between legs 62. First support section 40 and stabilizer section 42 thus provide three-point support or engagement with down tube 88. Referring to the right-hand portion of FIG. 6c, first support section 40 is shown as being pivoted to a horizontal orientation, such that recess 50 opens horizontally and is engaged with the seat post of bicycle 14, shown at 96. In this arrangement, stabilizer section 42 extends downwardly and rearwardly such that the tire and wheel of bicycle. 14, shown generally at 98, are positioned within open area 74 between legs 62. Retainer strap 84 is wrapped about the inside surface of the bicycle wheel, to provide both horizontal and vertical support for the bicycle.

As can be appreciated, stabilizer section 42 has a "mirror" type construction, allowing stabilizer section 42 to be pivoted in either direction about support bar 26 into engagement with a portion of bicycle 14. That is, open area 74 between legs 62 receives a structural or other member of bicycle 14 regardless of the direction of pivoting movement of stabilizer section 42, for engaging legs 62 about the bicycle member. In this manner, the user can place bicycle 14 in any position relative to bars 26 so that a down tube or other member of bicycle 14 is located on either side of support bar 26. Stabilizer section 42 can then be pivoted in either direction about support bar 26 so as to engage legs 62 about the down tube or other member of bicycle 14.

The various positions and configuration of first support section 40 and stabilizer section 42 as shown in FIGS. 6a–6c are representative of numerous positions which are possible for sections 40, 42, to accommodate various bicycle styles and to engage the bicycle at vertically spaced locations to stabilize the bicycle against swinging during transport. It can thus be appreciated that the stabilizing support of the present invention provides a relatively simple and efficient stabilizing arrangement for engaging various parts of a bicycle in various configurations, to provide significant flexibility in the bicycle styles which can be accommodated and for enhancing stability of bicycles when mounted to a vehicle-mounted carrier.

While stabilizing supports 38 have been illustrated and described with reference to a hitch-mounted rack, it should be understood that supports 38 may also be used in connection with a trunk-mounted rack or any other type of rack configuration. Further, while stabilizing supports 38 have been described and are particularly well suited for use in mounting bicycles to a carrier, it is understood that stabilizing supports 38 may also be employed to mount other types of equipment to a carrier.

Various alternatives and embodiments are contemplated as being within the scope of the following claims particularly pointing out and distinctly claiming the subject matter regarded as the invention.

I claim:

1. A stabilizing support for use in securing an article to a vehicle-mounted carrier having an axially extending load-carrying member, comprising:

a first support section adapted for engagement with the load-carrying member and including a first support structure adapted for engagement with the article in a first location; and a stabilizer section movably mounted relative to the first support section, wherein the stabilizer section includes an inner mounting section that is interconnected with and extends outwardly from the load-carrying member, and a pair of legs that are interconnected with and extend outwardly from the inner mounting section, wherein the inner mounting section and the pair of legs extend radially outwardly relative to the load-carrying member, wherein each log defines an inner end and an outer end, wherein the inner ends of the legs are connected together and wherein the legs are not connected together throughout the length of each leg between its inner end and its outer end to define an open area therebetween that terminates in a closed end defined by the connected inner ends of the legs, wherein the inner mounting section of the stabilizer section is operable to position the closed end of the open area outwardly from the load-carrying member, wherein the stabilizer section is movable relative to the first support section to a stabilizing position in which a portion of the article is received within the open area between the pair of legs so as to engage the article in a second location vertically spaced from the first location, to stabilize the article against swinging motion when the article is supported in the first location by the first support section.

2. The stabilizing support of claim 1, wherein the first support section defines a passage within which the load-carrying member is received.

3. The stabilizing support of claim 2, wherein the inner mounting section of the stabilizer section includes a pair of spaced mounting members, wherein the mounting members are pivotably mounted to the first support section for providing movement of the stabilizer section relative to the first support section.

4. A stabilizing support for use in securing an article to a vehicle-mounted carrier having a load-carrying member, comprising:

a first support section adapted for engagement with the load-carrying member and including a first support structure adapted for engagement with the article in a first location, wherein the first support section defines a passage within which the load-carrying member is received; and a stabilizer section movably mounted relative to the first support section, wherein the stabilizer section:

(A) includes a pair of legs defining a space therebetween, (B) is movable relative to the first support section to a stabilizing position in which a portion of the article is received within the space between the pair of legs so as to engage the article in a second location vertically spaced from the first location, to stabilize the article against swinging motion when the article is supported in the first location by the first support section, and (C) includes a pair of spaced mounting members, wherein the mounting members are pivotably mounted relative to the first support section for providing movement of the stabilizer section relative to the first support section, and wherein the mounting members, define spaced openings in alignment with the passage of the first support section, and wherein the load-carrying member extends through the spaced openings defined by the mounting members.

5. The stabilizing support of claim 4, further comprising a retainer strap engageable about the article in the first location when the article is engaged with the first support section.

6. The stabilizing support of claim 5, wherein the retainer strap includes a mounting area defining an opening through-which the load-carrying member extends.

7. The stabilizing support of claim 6, wherein the first support section includes a retainer strap engagement member located on a side of the first support section opposite the mounting area of the retainer strap, for engagement with the retainer strap when the retainer strap is placed about the article.

8. The stabilizing support of claim 4, further comprising engagement structure interposed between the first support section and the spaced mounting members of the stabilizer section for maintaining engagement of the stabilizer section with the first support section.

9. The stabilizing support of claim 8, wherein the engagement structure includes a ring and groove arrangement interposed between the first support section and the pair of mounting members.

10. The stabilizing support of claim 1, wherein the inner mounting section of the stabilizer section includes a connector section from which the pair of legs extend, wherein the inner ends of the legs are connected together at the connector section.

11. A stabilizing support for use in securing an article to a vehicle-mounted carrier having a load-carrying member, comprising:

a first support section adapted for engagement with the load-carrying member and including a first support structure adapted for engagement with the article in a first location; and a stabilizer section movably mounted relative to the first support section, wherein the stabilizer section:

(A) includes a pair of legs defining a space therebetween, (B) is movable relative to the first support section to a stabilizing position in which a portion of the article is received within the space between the pair of legs so as to engage the article in a second location vertically spaced from the first location, to stabilize the article against swinging motion when the article is supported in the first location by the first support section, and (C) includes a connector section from which the pair of legs extend, wherein the connector section includes a beveled surface bordering the space between the pair of legs.

12. The stabilizing support of claim 11, wherein each leg includes a beveled surface which is continuous with the beveled surface of the connector section and which borders the space between the legs.

13. The stabilizing support of claim 10, wherein the inner mounting section of the stabilizer section includes a pair of spaced mounting members which extend from the connector section, wherein the mounting members are pivotably mounted relative to the load-carrying member.

14. The stabilizing support of claim 10, wherein the stabilizer section is pivotable relative to the first support section, in both a first direction and a second direction for positioning the article between the pair of legs.

15. A stabilizing support for use in securing an article to a vehicle-mounted carrier having a load-carrying member, comprising:
- a first support section including first support structure adapted for engagement with the article in a first location; and
- a unitary stabilizer section pivotably mounted relative to the first support section for movement about a pivot axis, wherein the stabilizer section comprises a generally U-shaped member having a bight portion and a pair of legs, wherein the legs extend radially outwardly relative to the pivot axis and are connected together only at the bight portion and wherein an open area is defined between the legs outwardly of the bight portion, and wherein the stabilizer section is pivotably movable relative to the first support section so as to enable a portion of the article to be positioned within the open area when the article is engaged with the first support section, wherein the portion of the article positioned within the open area is vertically spaced from the first location to stabilize the article against swinging when the article is engaged in the first location with the first support section.

16. The stabilizing support of claim 15, wherein the stabilizer section and the first support section include aligned passage structure within which the load-carrying member is received.

17. The stabilizing support of claim 16, wherein the load-carrying member extends along a longitudinal axis that is coincident with the pivot axis about which the stabilizer section is pivotably movable relative to the first support section.

18. The stabilizing support of claim 17, wherein the first support section includes a central mounting portion within which a passage is formed, and wherein the stabilizer section includes a pair of mounting members located one adjacent each of a pair of ends defined by the central mounting portion.

19. The stabilizing support of claim 18, wherein each of the pair of mounting members defines an opening aligned with the passage in the central mounting portion of the first support section.

20. The stabilizing support of claim 15, wherein the unitary stabilizer section includes mounting structure extending inwardly from the bight portion of the stabilizer section and pivotably interconnected with the first support section for movement about the pivot axis.

21. A stabilizing support for use in securing an article to a vehicle-mounted carrier having a load-carrying member, comprising:
- a first support section including first support structure adapted for engagement with the article in a first location; and
- a unitary stabilizer section pivotably mounted relative to the first support section, wherein the stabilizer section:
  (A) includes a structure defining an open area,
  (B) is pivotably movable relative to the first support section so as to position a portion of the article within the open area when the article is engaged with the first support section, wherein the portion of the article positioned within the open area is vertically spaced from the first location to stabilize the article against swinging when the article is engaged in the first location with the first support section, and
  (C) comprises a connector section spaced outwardly from a pivot axis about which the stabilizer section is pivotable relative to the first support section, a mounting structure extending inwardly from the connector section and pivotably movable relative to the first support section, and a pair of legs extending outwardly from the connector section, wherein the open area is defined by the pair of legs in combination with the connector section, wherein the mounting structure comprises a pair of spaced-apart mounting members extending inwardly from the connector section, and wherein each mounting member includes an opening adapted to receive the load-carrying member.

22. The stabilizing support of claim 20, wherein the pair of legs and the bight portion of the connector section define continuous divergent beveled surfaces extending from the open area for facilitating engagement with the article.

23. The stabilizing support of claim 20, further comprising a retainer strap engageable with and between the pair of legs and with the article for engaging the article with and between the pair of legs.

24. The stabilizing support of claim 15, wherein the stabilizer section is pivotable in either a first direction or a second direction so as to enable a portion of the article to be positioned within the open area.

25. A stabilizing member for use in combination with a vehicle-mounted carrier having a load-carrying member adapted to engage an article in a first location to suspend the article from the load-carrying member, comprising:
- an inner mounting section adapted for pivotable interconnection with the load-carrying member for movement about a pivot axis so as to provide pivoting movement of the stabilizing member relative to the load-carrying member; and
- an outer engagement section extending from the inner mounting section, wherein the inner mounting section and the outer engagement section extend radially outwardly relative to the pivot axis, and wherein the outer engagement section is adapted to engage the article at a location vertically spaced from the first location, wherein the outer engagement section defines a closed inner end and an open outer end and includes a pair of outwardly extending members that are connected together at the closed inner end and are not connected together between the open outer end and the closed inner end, wherein the outwardly extending members define oppositely facing surfaces between which an open area is located, wherein pivoting movement of the stabilizing member relative to the load-carrying member enables a portion of the article to be positioned within the open area to stabilize the article against swinging.

26. The stabilizing member of claim 25, wherein the outwardly extending members comprise a pair of spaced apart legs between which the open area is located.

27. The stabilizing member of claim 26, wherein the closed inner end of the outer engagement section comprises a connector section from which the pair of spaced apart legs extend.

28. The stabilizing member of claim 27, wherein the legs and the connector section define oppositely facing beveled surfaces that border the open area.

29. The stabilizing member of claim 26, further comprising a releasable retainer arrangement selectively engageable with and between the pair of legs for releasably securing a portion of the article within the open area between the pair of spaced apart legs.

* * * * *

UNITED STATES PATENT AND TRADEMARK OFFICE
CERTIFICATE OF CORRECTION

PATENT NO.    : 6,616,023 B1
DATED         : September 9, 2003
INVENTOR(S)   : Mark A. Dahl et al.

It is certified that error appears in the above-identified patent and that said Letters Patent is hereby corrected as shown below:

<u>Column 7,</u>
Line 19, delete "log" and substitute therefore -- leg --;

<u>Column 8,</u>
Line 4, after "members" delete ",";
Line 14, delete "through-" and substitute therefore -- through --.

Signed and Sealed this

Sixteenth Day of December, 2003

JAMES E. ROGAN
*Director of the United States Patent and Trademark Office*